(12) United States Patent
Singhal et al.

(10) Patent No.: US 7,827,151 B2
(45) Date of Patent: Nov. 2, 2010

(54) HIGH AVAILABILITY VIA DATA SERVICES

(75) Inventors: Vivek P. Singhal, Los Altos, CA (US);
Ian David Emmons, Pittsford, NY (US)

(73) Assignee: Progress Software Corporation, Bedford, MA (US)

( * ) Notice: Subject to any disclaimer, the term of this patent is extended or adjusted under 35 U.S.C. 154(b) by 398 days.

(21) Appl. No.: 11/874,116

(22) Filed: Oct. 17, 2007

(65) Prior Publication Data
US 2008/0034251 A1   Feb. 7, 2008

Related U.S. Application Data
(62) Division of application No. 10/679,015, filed on Oct. 2, 2003, now Pat. No. 7,290,015.

(51) Int. Cl.
*G06F 17/30* (2006.01)
(52) U.S. Cl. .................. 707/674; 707/640; 707/661; 711/145
(58) Field of Classification Search ............ 707/10, 707/202, 204, 205, 640, 661, 674; 709/214; 714/710, 718; 711/145
See application file for complete search history.

(56) References Cited

U.S. PATENT DOCUMENTS

| | | | | |
|---|---|---|---|---|
| 5,884,328 A * | 3/1999 | Mosher, Jr. | .............. | 707/674 |
| 6,336,172 B1 * | 1/2002 | Day et al. | .................. | 711/161 |
| 6,393,466 B1 * | 5/2002 | Hickman et al. | ............ | 709/214 |
| 6,463,513 B1 * | 10/2002 | Bish et al. | ................... | 711/161 |
| 6,523,036 B1 * | 2/2003 | Hickman et al. | .............. | 707/10 |
| 7,013,305 B2 * | 3/2006 | Elko et al. | ................. | 707/640 |

* cited by examiner

*Primary Examiner*—Shahid A Alam
(74) *Attorney, Agent, or Firm*—Fenwick & West LLP

(57) ABSTRACT

Application-level replication, the synchronization of data updates within a cluster of application servers, may be provided by having application servers themselves synchronize all updates to multiple redundant databases, precluding the need for database-level replication. This may be accomplished by first sending a set of database modifications requested by the transaction to a first database. Then a message may be placed in one or more message queues, the message indicating the objects inserted, updated, or deleted in the transaction. Then a commit command may be sent to the first database. The set of database modifications and a commit command may then be sent to second database. This allows for transparent synchronization of the database and quick recovery from a database failure, while imposing little performance or network overhead.

5 Claims, 15 Drawing Sheets

HIGH AVAILABILITY VIA DATA SERVICES

CROSS-REFERENCE TO RELATED APPLICATIONS

This application is a divisional application of pending U.S. application Ser. No. 10/679,015, entitled "High Availability Via Data Services," filed Oct. 2, 2003, the disclosure of which is incorporated be reference in its entirety.

FIELD OF THE INVENTION

The present invention relates to the field of middleware. More particularly, the present invention relates to a high-availability middleware solution that allows for quick recovery after a failure.

BACKGROUND OF THE INVENTION

High-availability (HA) architectures are computer systems designed to, as best as possible, ensure continuous data and application availability, even when application components fail. These systems are typically used for applications that have a high cost associated with every moment of downtime. Example applications include Wall Street trading software (e.g., investment firms) and transportation/logistics tracking (e.g., package delivery companies). Since occasional failures are unavoidable, it is extremely important to reduce the amount of time it takes to recover from a failure in these systems.

The most common failure to occur in HA systems is an individual machine failure. Here, one of the machines or components in the system will stop working. In order to protect against such failures, redundant machines or components are commonly used. FIG. 1 is a figure illustrating a typical redundant architecture for a database application. A pool of application servers processes requests from clients. If one of the application servers fails, another application server is available to take its place. The application servers, in turn, retrieve and modify data from a database. To ensure that the HA system continues to operate even if a database fails, multiple database server components are organized into an operating system level cluster 100. In this case, two database servers 102, 104 are configured as a cluster. The standby database 104 is kept in a running state, and in case of failure it automatically steps in for the primary database 102. The standby database 104 is alerted to a failure in the primary database 102 when it fails to receive a heartbeat signal. The standby database 104 is kept up-to-date by periodic database-level or disk-level replication of the primary database 102.

The main drawback of these types of architectures, however, is that the time to recover is lengthy. The standby database 104 needs to process the transaction and recovery logs left behind by the primary database 102 before it can start servicing requests. This results in an unacceptably long failover time (typically several minutes).

What is needed is a solution that reduces failover time to an acceptable level.

BRIEF DESCRIPTION

Application-level replication, the synchronization of data updates within a cluster of application servers, may be provided by having application servers themselves synchronize all updates to multiple redundant databases, precluding the need for database-level replication. This may be accomplished by first sending a set of database modifications requested by the transaction to a first database. Then a message may be placed in one or more message queues, the message indicating the objects inserted, updated, or deleted in the transaction. Then a commit command may be sent to the first database. The set of database modifications and a commit command may then be sent to a second database. This allows for transparent synchronization of the databases and quick recovery from a database failure, while imposing little performance or network overhead.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
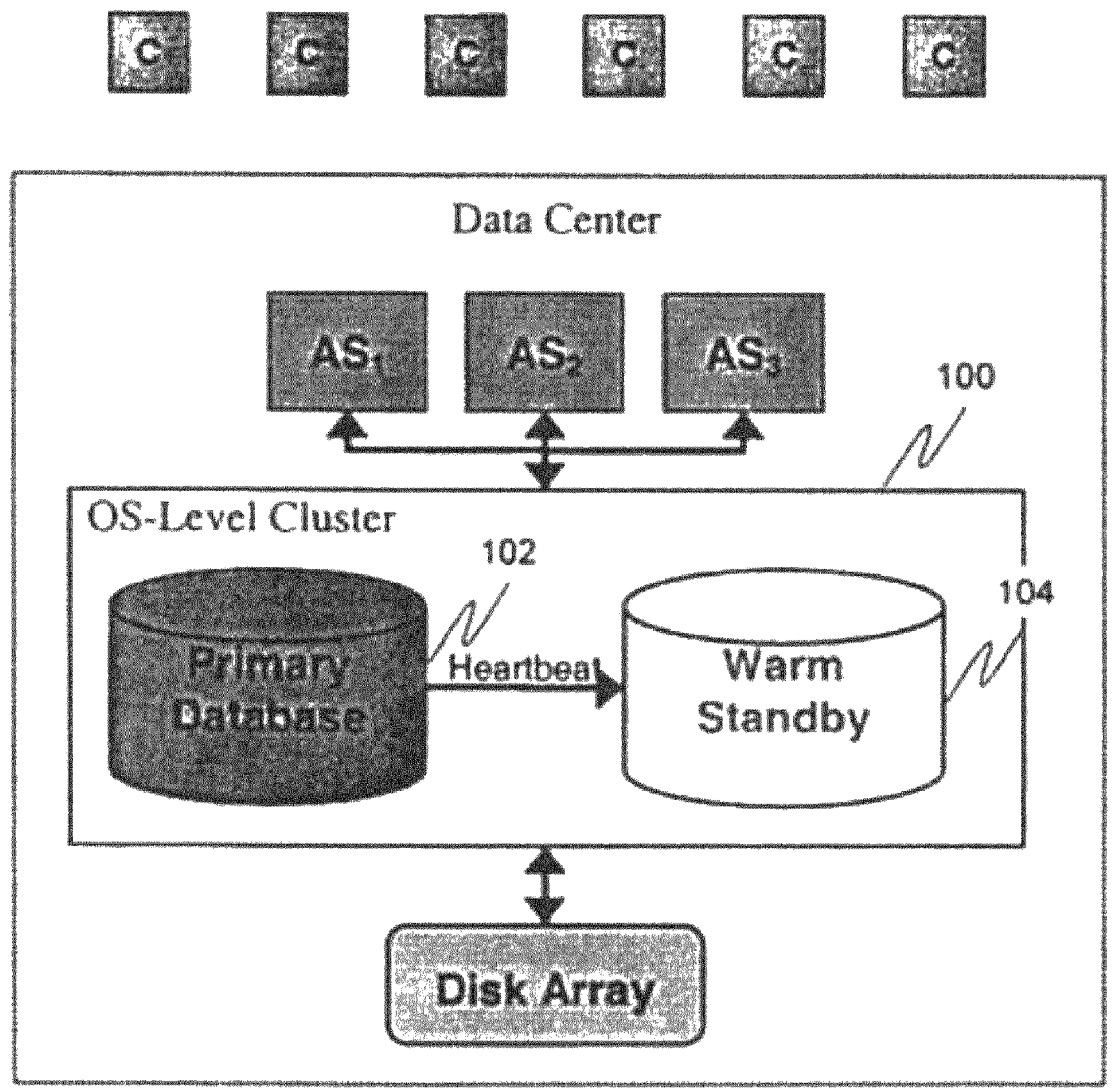
FIG. 1 is a figure illustrating a typical redundant architecture for a database application.

Embodiments of the present invention are described herein in the context of a system of computers, servers, and software.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The present application provides for application-level replication, the synchronization of database updates within a cluster of application servers. The application servers themselves may synchronize all data updates to the multiple redundant databases, precluding the need for database-level replication. This has several benefits. First, the applications do not need to be explicitly aware of the replication that occurs in the system. Both databases may be kept synchronized transparently. Second, application-level replication imposes little performance or network overhead. Transaction processing can occur at full speed. Third, when a database failure occurs, recovery is very fast, nearly instantaneous. Recovery from an application server failure is also quite fast, though not as fast. Fourth, if the application can tolerate momentary differences in the committed content of the first and second databases, then the second database can be actively used to perform transaction processing under normal conditions (called multi-master replication).

Figure 2:
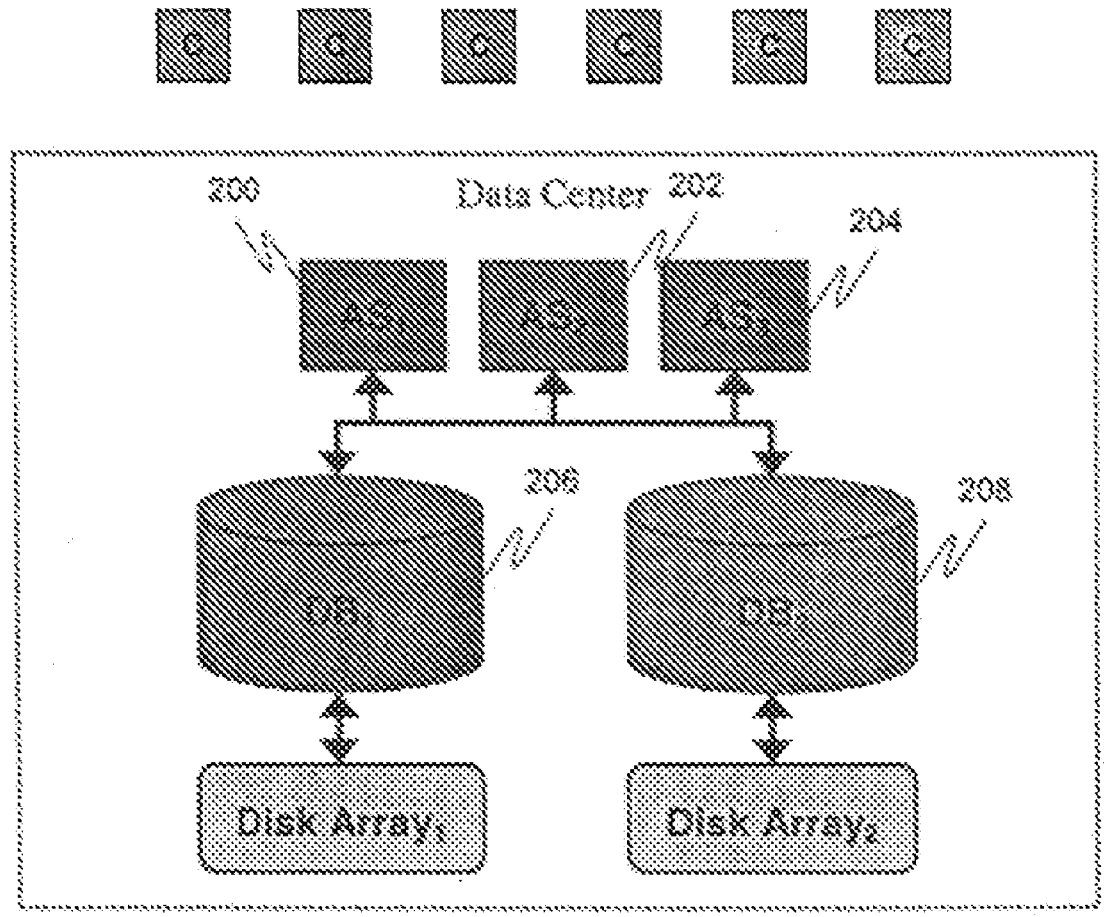
FIG. 2 is a diagram illustrating a high-level architecture for application-level replication in accordance with an embodiment of the present invention.

FIG. 2 is a diagram illustrating a high-level architecture for application-level replication in accordance with an embodiment of the present invention. Application servers 200, 202, 204 replicate all updates to both databases 206, 208. It should be noted that the databases 206, 208 are labeled as $DB_1$ and $DB_2$, rather than primary and standby, indicating that they are peers rather than master and slave. Therefore, the extra infrastructure represented by $DB_2$ 208 does not have to be held in reserve to be used only upon failure. The result is that processing capacity is doubled under normal operations.

Figure 3:
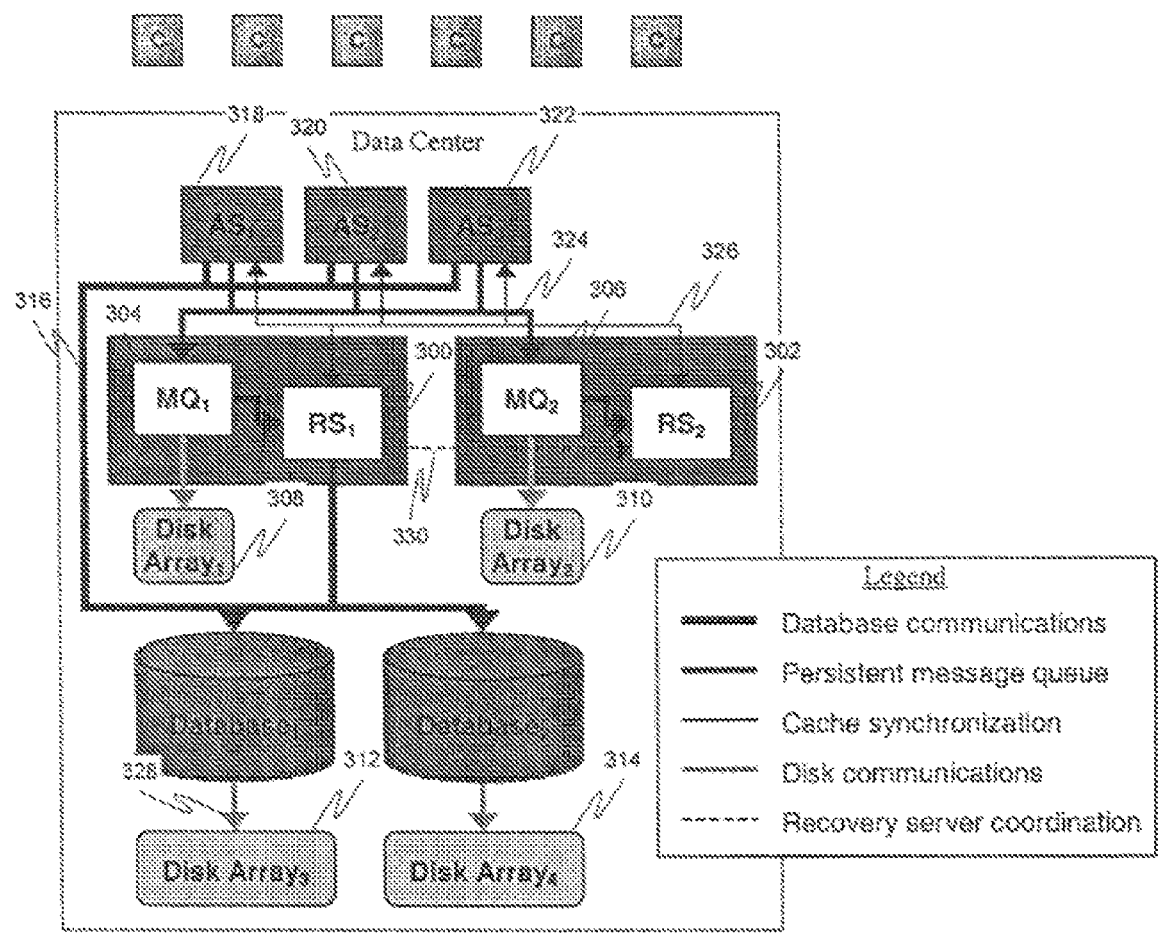
FIG. 3 is a diagram illustrating a specific architecture for application-level replication in accordance with an embodiment of the present invention.

Another component may be introduced into the HA architecture along with application-level replication. FIG. 3 is a diagram illustrating a specific architecture for application-level replication in accordance with an embodiment of the present invention. In this embodiment, recovery servers 300, 302 are included. The purpose of a recovery server is to store a log of recent data updates. In the event of a database or disk array failure, these stored data updates can be used to rapidly reconcile the content of the surviving database and disk array. While the system may include only a single recovery server, in the embodiment of FIG. 3 two recovery servers are provided in order to avoid introducing a single point of failure. One recovery server 300 performs the actual recover duties, while the other 302 serves as a hot standby.

Each recovery server may itself be an application server, running a specialized program that handles tasks related to replication and recovery. The recovery server works in conjunction with a persistent message queue run by a message queue manager 304, which it may use to store messages. In an embodiment of the present invention, the persistent queue has exactly one-time delivery features. Each recovery server may also be a recipient of cache synchronization messages, which are independent of the persistent message queue's messages. The message queue managers 304, 306 may be co-located on the same machine as the recovery servers 300, 302, respectively. The disk arrays 308, 310, 312, 314 represent highly reliable storage—they may be installed in the server machines or exist as separate appliances, or they may represent partitions on a single disk array.

There are several communications paths illustrated in FIG. 3. Database communications 316 may proceed through typical channels (e.g., OCI for Oracle, CT-lib for Sybase, etc.). The application servers 318, 320, 322 duplicate these communications 324 to local queues associated with the message queue managers 304, 306. These messages may then be retrieved by the recover servers 300, 302. The application servers may act as clients to the message queues.

Within each of the application servers 318, 320, 322 may reside an in-memory cache that contains a copy of working objects from the database. This cache serves as a means for rapidly retrieving frequently used objects. The cache also serves as the interface for the application logic within the application servers to interact with the databases. The application servers 318, 320, 322 may communicate with each other and with the recovery servers 300, 302 via cache synchronization messages 326, which may be delivered over a standard messaging system. The messaging need not be guaranteed (exactly-one-time) delivery. It may be logically separate from the persistent message queue, though the two may share the same software. Disk communications 328 may use standard file storage protocols. Like the cache synchronization, the recovery server coordination 330 may use a standard messaging system, which need not be guaranteed (exactly-one-time) delivery. It may be logically separate from both the persistent message queue and the cache synchronization, though it may use the same software as either of the other two.

In an embodiment of the present invention, all database tables may contain an optimistic control attribute, which is an integer column managed by the system to detect and resolve conflicts resulting from race conditions. Additionally, in an embodiment of the present invention, an extra database table known as the transaction ID table may be added to the two databases. This table may contain two columns, a unique integer primary key and a timestamp that records the row creation time. This table may be managed entirely by the cache and be invisible to the application logic. This table will be discussed in more detail below.

Figure 4:
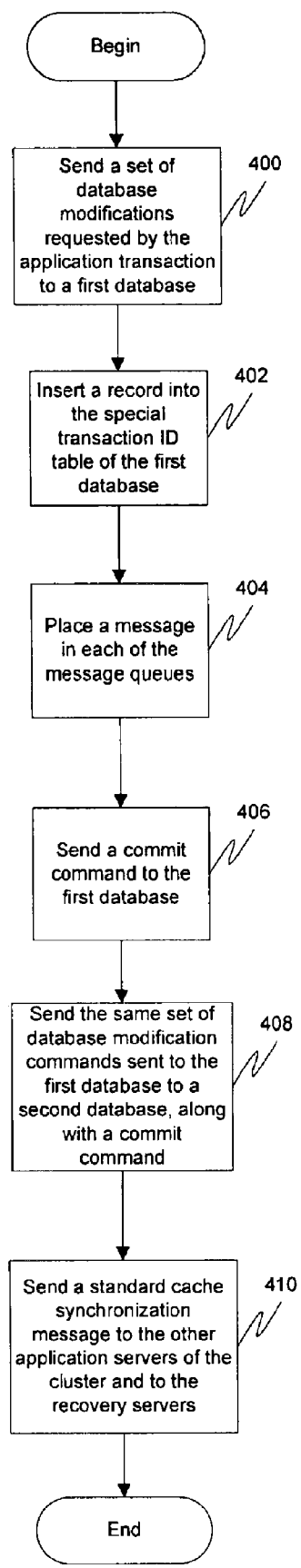
FIG. 4 is a flow diagram illustrating a method for performing a transaction commit in accordance with an embodiment of the present invention.

FIG. 4 is a flow diagram illustrating a method for performing a transaction commit in accordance with an embodiment of the present invention. This method may be performed by application server 318 in FIG. 3. At 400, it may send a set of database modifications requested by the application transaction to a first database. In one embodiment of the present invention, these may comprise a set of Structured Query Language (SQL) insert, update, and delete commands. The first database may be database 332 in FIG. 3. At 402, it may insert a record into the special transaction ID table, thereby generating a unique ID for the transaction. This may be performed in the same transaction as 400. At this point, the application server has not sent the commit command to the database.

At 404, the application server may place a message in each of the message queues (operated by message queue managers 304, 306 of FIG. 3). This message may contain the "payload" of a typical cache synchronization message—namely, a serialized representation of the objects inserted, updated, or deleted in the transaction. It should be noted that because the insert in the transaction ID table was part of the transaction, this insert may also be included in the cache synchronization payload. When the message queue managers 304, 306 eventually receive this message, the recovery servers 300, 302 need not process the message by removing it from their respective queues. Rather, they may "peek ahead" at the message while leaving it in the queues. As they do, they may index the message by several criteria so that later on they can look up the message rapidly without re-scanning all of the queued messages.

At 406, the application server may send a commit command to the first database. At 408, it may then send the same set of database modification commands it sent to the first database to a second database, along with a commit command. The transaction ID may also be inserted into the second database transaction ID table at this point as well.

At 410, the application server may send a standard cache synchronization message to the other application servers of the cluster and to the recovery servers. Upon receiving the synchronization message, the application servers may update their caches accordingly. When the recovery servers 300, 302 receive this cache synchronization message, they may then extract the transaction ID and use it to find and discard the corresponding message in the respective message queues.

In addition to the above, in an embodiment of the present invention there will be a background thread of the recovery server that periodically deletes old rows from the transaction ID table during normal operation. Additionally, the recovery servers may periodically send heartbeat signals to each other every few seconds to allow a functioning recovery server to take over recovery responsibilities in case a recovery server fails.

There is a certain amount of overhead imposed on the application server when application transactions commit. The application server is responsible not only for updating the first database and sending a cache synchronization message, as it normally does, but also for storing a message in the message queues and updating the second database. To minimize this overhead, the update to the second database and the generation of the cache synchronization message may be performed asynchronously on separate threads. For applications that are not database-constrained, the extra responsibilities on the application server should not result in significant performance impact. It should be noted that although the application server updates two databases and message queues, no two-phase distributed transactions are required.

The role of the second database may be determined by the tolerance of the application to momentary discrepancies between the first and second databases. If no discrepancies can be tolerated, then the first database may act as the master database and the second database may act as the slave. If momentary discrepancies can be tolerated, then both the first database and the second database may process requests from their respective application server cluster. Changes will be rapidly reflected in both databases, as each application server is responsible for sending updates to both.

Figure 5:
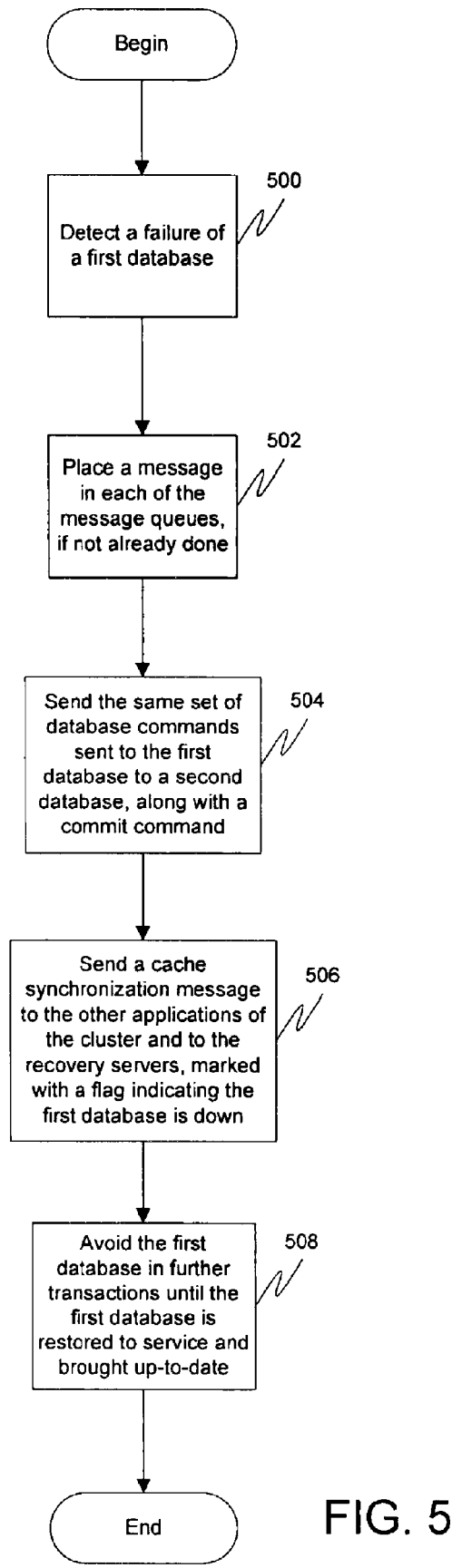
FIG. 5 is a flow diagram illustrating a method for failover from a failure of a first database in accordance with an embodiment of the present invention.

FIG. 5 is a flow diagram illustrating a method for failover from a failure of a first database in accordance with an embodiment of the present invention. A failure of the first database will typically manifest itself as an error from the database client library. If the error indicates a minor or transient failure, then an exception may be thrown back to the application logic code for handling. On the other hand, if it is a fatal error, indicating a database failure, then the application server may execute the following recovery procedure.

A failure of the first database will be detected during 400, 402, or 406 of the method described in FIG. 4. In all cases, the transaction in the first database will not be completed, and thus the application server may note the fact that the database is down and proceeds with the rest of the method (or at least those steps it can execute while the first database is down). For example, if the failure is detected in 400, the application server may proceed to 404, 408, and 410. If the failure is detected in 406, the application server may proceed to 408 and 410.

In 410, the cache synchronization message may be marked with a flag indicating that the first database is down. Upon receiving the specially marked cache synchronization message, the recovery server need not discard the corresponding message from its persistent message queue. Instead, the recovery server may wait for the first database to be restored, at which point it replays to the first database the inserts, updates, and deletes that are captured in the persistent message's payload. Then the recovery server may discard the message from the queue.

In future transactions, the application server knows that it must avoid the first database and may go directly to the second database until the first database is restored to service and brought up-to-date by the recovery server.

The failover here is very nearly instantaneous, once the application server discovers that the database server is down. However, this discovery may take some time in situations where a timeout of some sort must expire. For instance, the application server may need to wait for a TCP socket timeout before the database client libraries deliver the error code that signals failure. The length of such timeout is somewhat beyond the control of the system, though it may be tuned by a system administrator.

Therefore, at 500, a failure of a first database may be detected. At 502, the application server may place a message in each of the message queues as described in 404 of FIG. 4 above, if that has not already been done by the time the failure is detected. At 504, the application server may then send the same set of database modification commands it sent to the first database to a second database, along with a commit command. This is described in 408 of FIG. 4 above. At 506, the application server may send a cache synchronization message to the other application servers of the cluster and to the recovery servers. While this is similar to what was described in 410 of FIG. 4 above, here the cache synchronization message is marked with a flag that indicates that the first database is down. At 508, the application server may avoid the first database in future transactions until the first database is restored to service and brought up-to-date by a recovery server.

Figure 6:
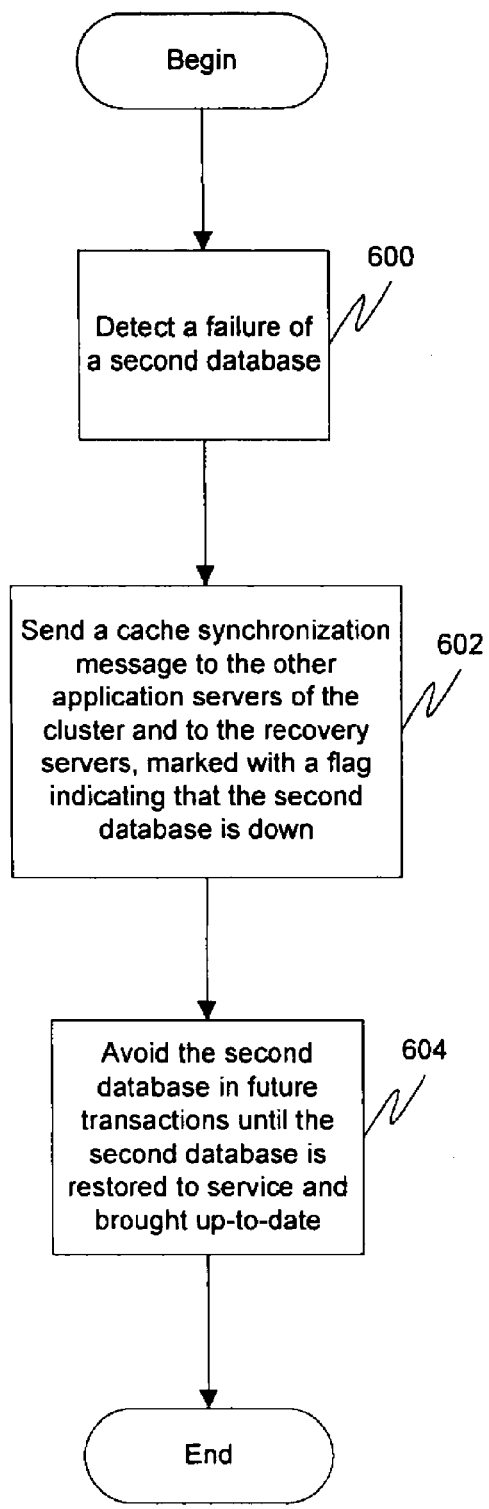
FIG. 6 is a flow diagram illustrating a method for failover from a failure of a second database in accordance with an embodiment of the present invention.

FIG. 6 is a flow diagram illustrating a method for failover from a failure of a second database in accordance with an embodiment of the present invention. A failure of the second database will typically manifest itself in 408 of FIG. 4. Here, the application server may then simply proceed with 410, while marking the cache synchronization method with a flag indicating that the second database is down. Upon receiving this specially marked cache synchronization message, the recovery server need not discard the corresponding message from its persistent message queue. Instead, the recovery server may wait for the second database to be restored, at which point it may replay the database inserts, updates, and deletes that are captured in the persistent message's payload. The recovery server may then discard the message from the queue.

The application server knows that it must avoid the second database until it is restored and brought up-to-date by the recovery server.

Therefore, at 600, a failure of a second database may be detected. At 602, the application server may send a cache synchronization message to the other application servers of the cluster and to the recovery servers. While this is similar to what was described in 410 of FIG. 4 above, here the cache synchronization message is marked with a flag that indicates that the second database is down. At 604, the application server may avoid the second database in future transactions until the second database is restored to service and brought up-to-date by a recovery server.

Figure 7:
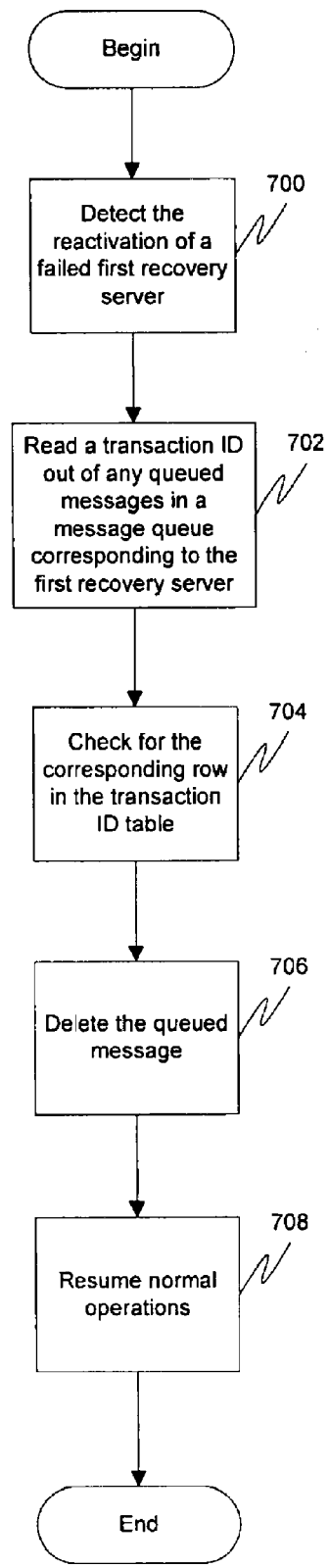
FIG. 7 is a flow diagram illustrating a method for restoring from a failure of a first recovery server in accordance with an embodiment of the present invention.

FIG. 7 is a flow diagram illustrating a method for restoring from a failure of a first recovery server in accordance with an embodiment of the present invention. The second recovery server will usually detect the failure of the first recovery server by an interruption in the heartbeat messages sent by the first recovery server. At that point, the second recovery server will assume the recovery server duties. Because it has been receiving both the cache synchronization and the persistent message queue traffic, it is ready to step in at any time. When the failure is corrected so that the first recovery server is brought back online, all of the messages in the persistent queue that it missed will be waiting for processing. However, the corresponding cache synchronization messages may have vanished. Therefore, the first recovery server may read the transaction ID out of the queued messages and check for the corresponding row in the special transaction ID table. If it exists, then there is no need for the queued message anymore, so it may be deleted. If not, the message maybe saved for later processing. Once the entire queue has been scanned in this way, the recovery server can begin sending heartbeat messages and the two recovery servers may revert to their normal roles.

Therefore, at 700, the reactivation of a failed first recovery server may be detected. At 702, the first recovery server may read a transaction ID out of any queued messages in its corresponding message queue. At 704, it may check for the corresponding row in the special transaction ID table. If it exists, then at 706 the queued message may be deleted. Once all the queued messages have been processed, then at 708 the first recovery server may resume normal operations.

Because the persistent message queue delivers its messages whether or not the recovery servers are running at the time of the sending, the application servers (and therefore the clients) see no interruption of service. The second recovery server takes over immediately after the heartbeat messages stop, so if the heartbeat interval is sent to one or two seconds, the delay will be no more than ten seconds. Failure of the second recovery server may be handled in a similar way, except that no switch in the primary and standby roles is necessary.

Figure 8:
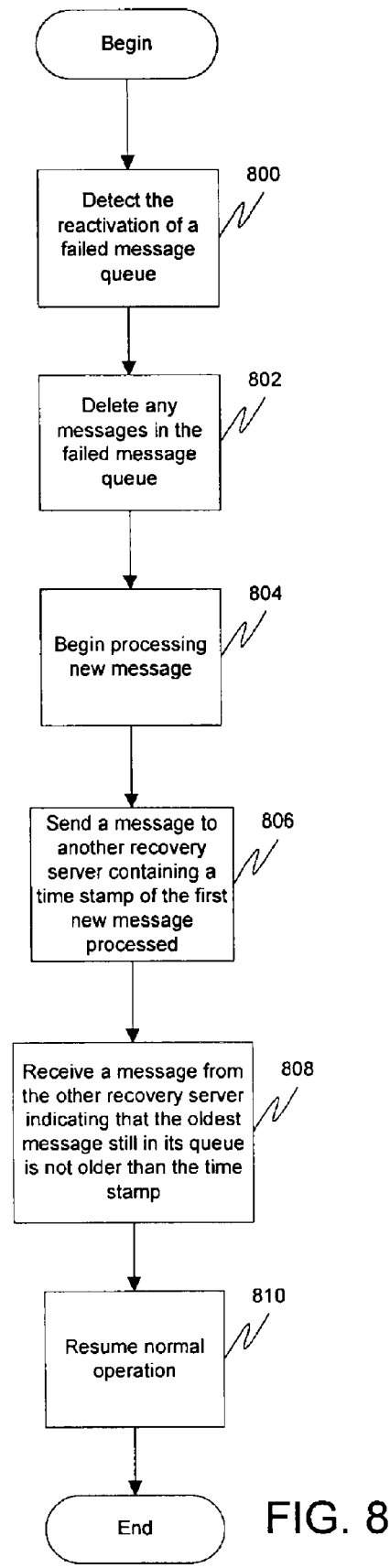
FIG. 8 is a flow diagram illustrating a method for restoring from a failure of a message queue in accordance with an embodiment of the present invention.

FIG. 8 is a flow diagram illustrating a method for restoring from a failure of a message queue in accordance with an embodiment of the present invention. A failure of either message queue will typically be detected by both the application servers (in 404 of FIG. 4 above) and by one of the recovery servers (as they attempt to receive messages). The application servers may ignore such failures, because their messages are getting through to the other queue. The affected recovery server, upon noticing that its queue is down, may send a signal to the other recovery server that it cannot continue. In that way, the failover is handled in a way similar to that of the failure of a recovery server, except that the failure may be communicated explicitly rather than by the absence of heartbeat messages.

Restoration of service may be a bit trickier. This is because when the failed queue is restored to service, it will not contain any of the messages sent while it was down. To rectify this, the associated recovery server will empty its queue and start processing all new messages. In addition, it may send a message to the other recovery server containing the time stamp of the first new message it receives. The other recovery server may respond when the oldest message still in its queue is not older than this time stamp. At that point, the recovery server associated with the formerly failed queue will know that it is up-to-date and ready to resume normal operation.

Therefore, at 800, the reactivation of a failed message queue may be detected. Then at 802, the recovery server corresponding to the failed message queue may delete any messages in the failed message queue. At 804, it may then begin processing all new messages. At 806, it may send a message to another recovery server containing a time stamp of the first new message it processes. At 806, a message from the other recovery server may be received indicating that the oldest message still in its queue is not older than the time stamp. At 808, the recovery server associated with the failed queue may resume normal operation.

Figure 9:
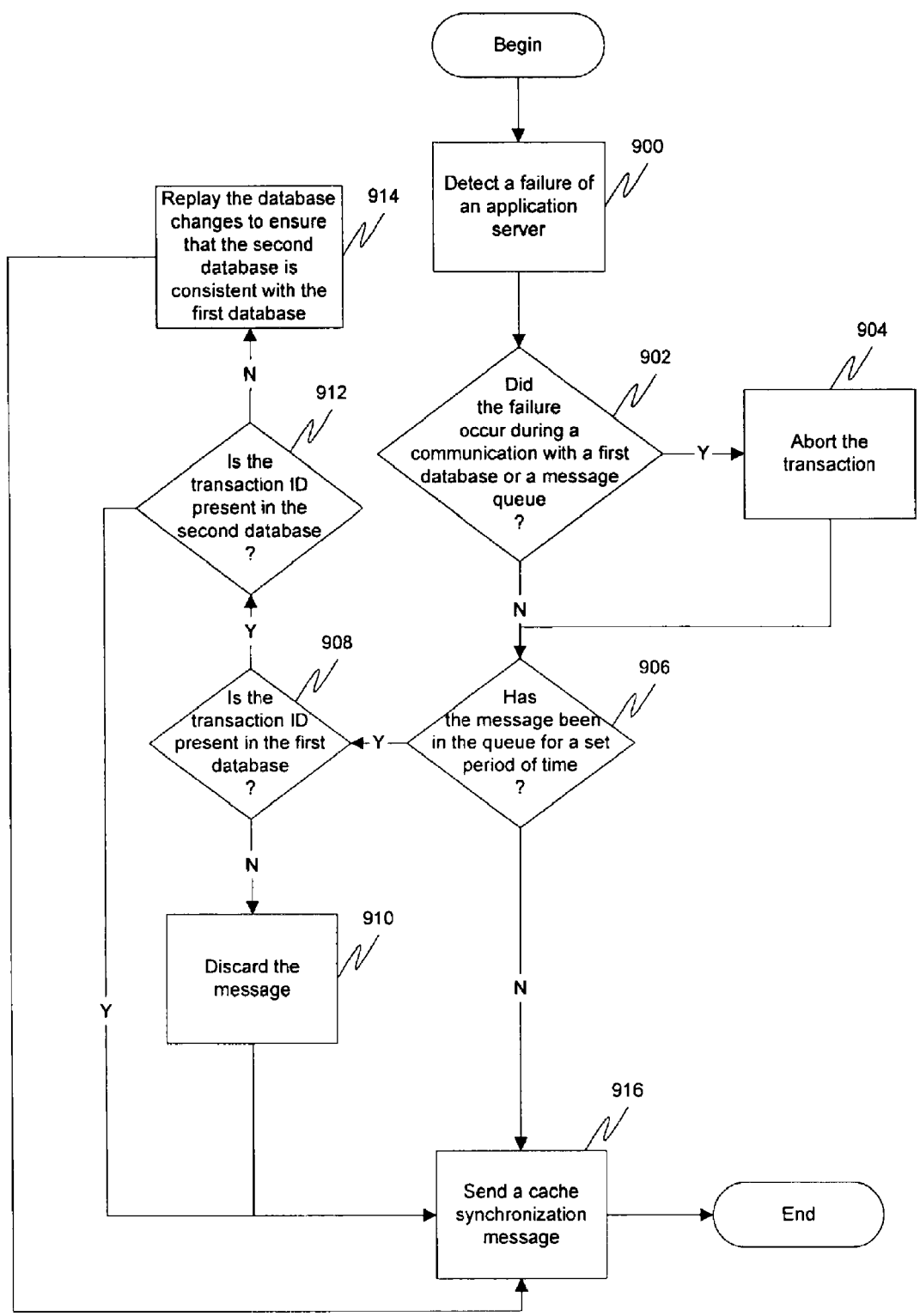
FIG. 9 is a flow diagram illustrating a method for failover from a failure of an application server in accordance with an embodiment of the present invention.

FIG. 9 is a flow diagram illustrating a method for failover from a failure of an application server in accordance with an embodiment of the present invention. For the failure of an application server, there are a number of scenarios to consider. If the failure occurs during 400, 402, or 404 of FIG. 4, then the first database may automatically abort the transaction. If the failure occurs during 406 of FIG. 4, then the database may automatically abort the transaction and the recovery server will eventually notice that the message has been in its persistent message queue for a period of time (e.g., 5 seconds). The recovery server may then check the transaction ID table in the first database to see if the transaction's ID is present. In this case, it will not find it, so it may conclude that the transaction never committed and it may discard the message.

If the failure occurs during 408 of FIG. 4, then the recovery server will notice that the message has been in its queue for a period of time (e.g., 5 seconds). The recovery server may then find the transaction ID in the first database but not the second database. The recovery server may then replay the database changes to ensure that the second database is consistent with the first database. Then the recovery server may send a cache synchronization message so that the other application servers can update their caches.

If the failure occurs during 410 of FIG. 4, then the recovery server will notice that the message has been in its queue for a period of time (e.g., 5 seconds), and it will determine that the first database and the second database have already been updated. Therefore, the recovery server may simply send a synchronization message so that the other application servers can update their caches.

Therefore, at 900, a failure of an application server may be detected. At 902, it may be determined if the failure occurred during a communication with a first database or a message queue. This would include 400, 402, 404, or 406 of FIG. 4. If so, then at 904 the first database may automatically abort the transaction. At 906, the recovery server may determine if the message has been in the queue for a set period of time (e.g., 5 seconds). If so, then at 908 the recovery server may check the transaction ID table in the first database to see if the transaction's ID is present. If not, then at 910 it may discard the message. If so, then at 912 it may determine if the transaction ID is present in the second database. If not, then at 914 the recovery server may replay the database changes to ensure that the second database is consistent with the first database. Then at 916, it may send a cache synchronization message so that the other application servers can update their caches.

Figure 10:
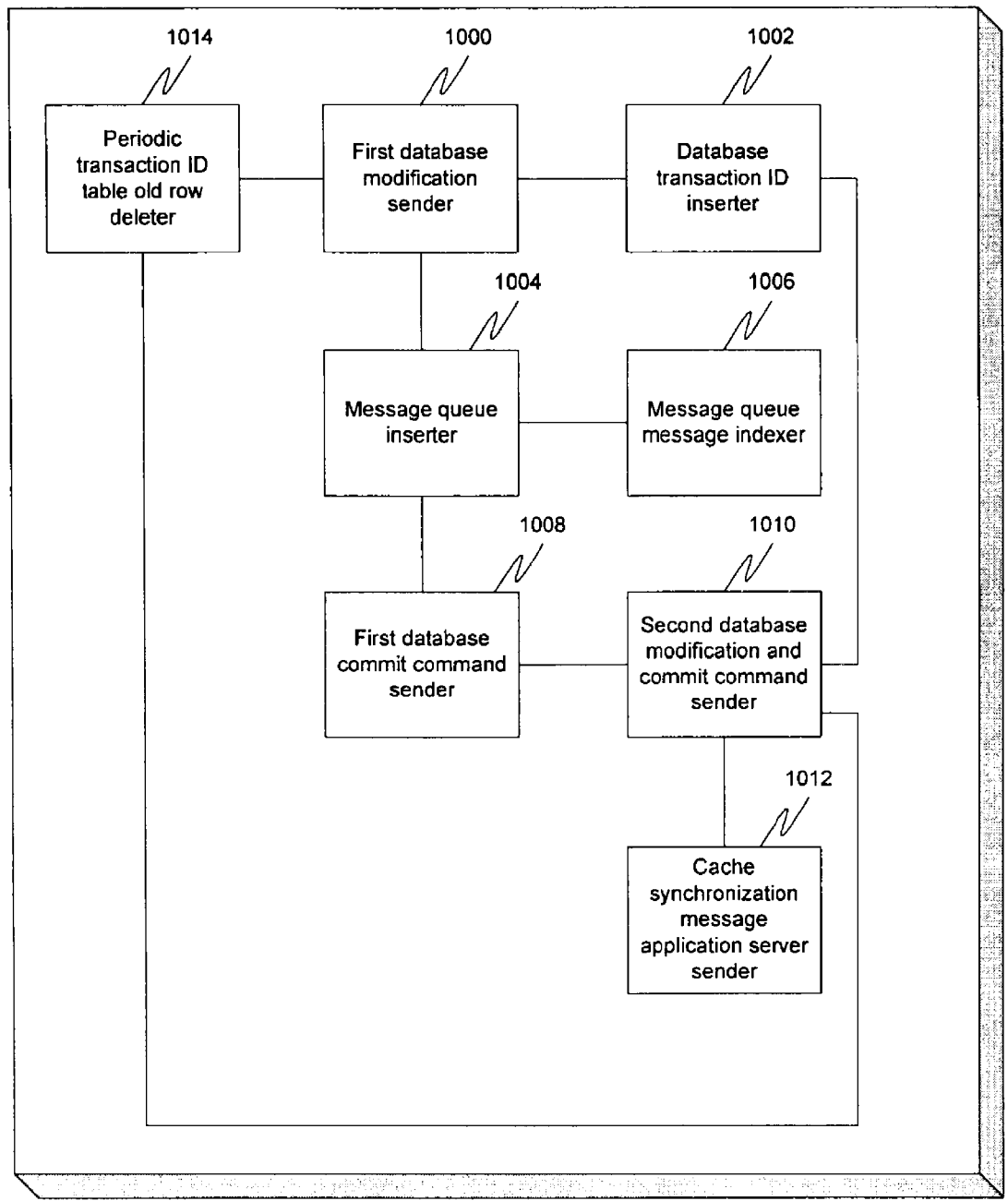
FIG. 10 is a block diagram illustrating an apparatus for performing a transaction commit in accordance with an embodiment of the present invention.

FIG. 10 is a block diagram illustrating an apparatus for performing a transaction commit in accordance with an embodiment of the present invention. This apparatus may be located on application server 318 in FIG. 3. A first database modification sender 1000 may send a set of database modifications requested by the application transaction to a first database. In one embodiment of the present invention, these may comprise a set of Structured Query Language (SQL) insert, update, and delete commands. The first database may be database 332 in FIG. 3. A database transaction ID inserter 1002 coupled to the first database modification sender 1000 may insert a record into the special transaction ID table, thereby generating a unique ID for the transaction. This may be performed in the same transaction as the sending of the set of database modifications. At this point, the application server has not sent the commit command to the database.

A message queue message inserter 1004 coupled to the first database modification sender 1000 may place a message in each of the message queues (operated by message queue managers 304, 306 of FIG. 3). This message may contain the "payload" of a typical cache synchronization message namely, a serialized representation of the objects inserted, updated, or deleted in the transaction. It should be noted that because the insert in the transaction ID table was part of the transaction, this insert may also be included in the cache synchronization payload. When the recovery servers 300, 302 eventually receive this message, they need not remove it from their respective queues. Rather, they may "peek ahead" at it while leaving it in the queues. As they do, they may index the message by several criteria so that later on they can look up the message rapidly without re-reading all of the queued messages. This may be performed by a message queue message indexer 1006 coupled to the message queue message inserter 1004.

A first database commit command sender 1008 coupled to the message queue message inserter 1004 may send a commit command to the first database. A second database modification and commit command sender 1010 coupled to the first database commit command sender 1008 and to the database transaction D inserter 1002 may send the same set of database modification commands it sent to the first database to a second database, along with a commit command. The database transaction ID inserter 1002 may insert the transaction ID into the second database transaction ID table at this point as well.

A cache synchronization message application server sender 1012 coupled to the second database modification and commit command sender 1010 may send a standard cache synchronization message to the other application servers of the cluster and to the recovery servers. Upon receiving the synchronization message, the application servers may update their caches accordingly. When the recovery servers 300, 302 associated with the first application server 318 receive this cache synchronization message, they may then extract the transaction ID and use it to find and discard the corresponding message in the message queues.

In addition to the above, in an embodiment of the present invention there will be a background thread of the recovery server that periodically deletes old rows from the transaction ID table during normal operation using a periodic transaction ID table old row deleter 1014 coupled to the first database modification sender 1000 and to the second database modification and commit command sender 1010. Additionally, the recovery servers may periodically send heartbeat signals to each other every few second to allow a functioning recovery server to take over recovery responsibilities in case a recovery server fails.

There is a certain amount of overhead imposed on the application server when application transactions commit. The application server is responsible not only for updating the first database and sending a cache synchronization message, as it normally does, but also for storing a message in the recovery server and updating the second database. To minimize this overhead, the update to the second database and the generation of the cache synchronization message may be performed asynchronously on separate threads. For applications that are not database-constrained, the extra responsibilities on the application server should not result in significant overhead increase. It should be noted that although the application server updates two databases and message queues, no two phase distributed transactions are required.

The role of the second database may be determined by the tolerance of the application to momentary discrepancies between the first and second databases. If no discrepancies can be tolerated, then the first database may act as the master database and the second database may act as the slave. If momentary discrepancies can be tolerated, then both the first database and the second database may process requests from their respective application server cluster. Changes will be rapidly reflected in both databases, as each application server is responsible for sending updates to both.

Figure 11:
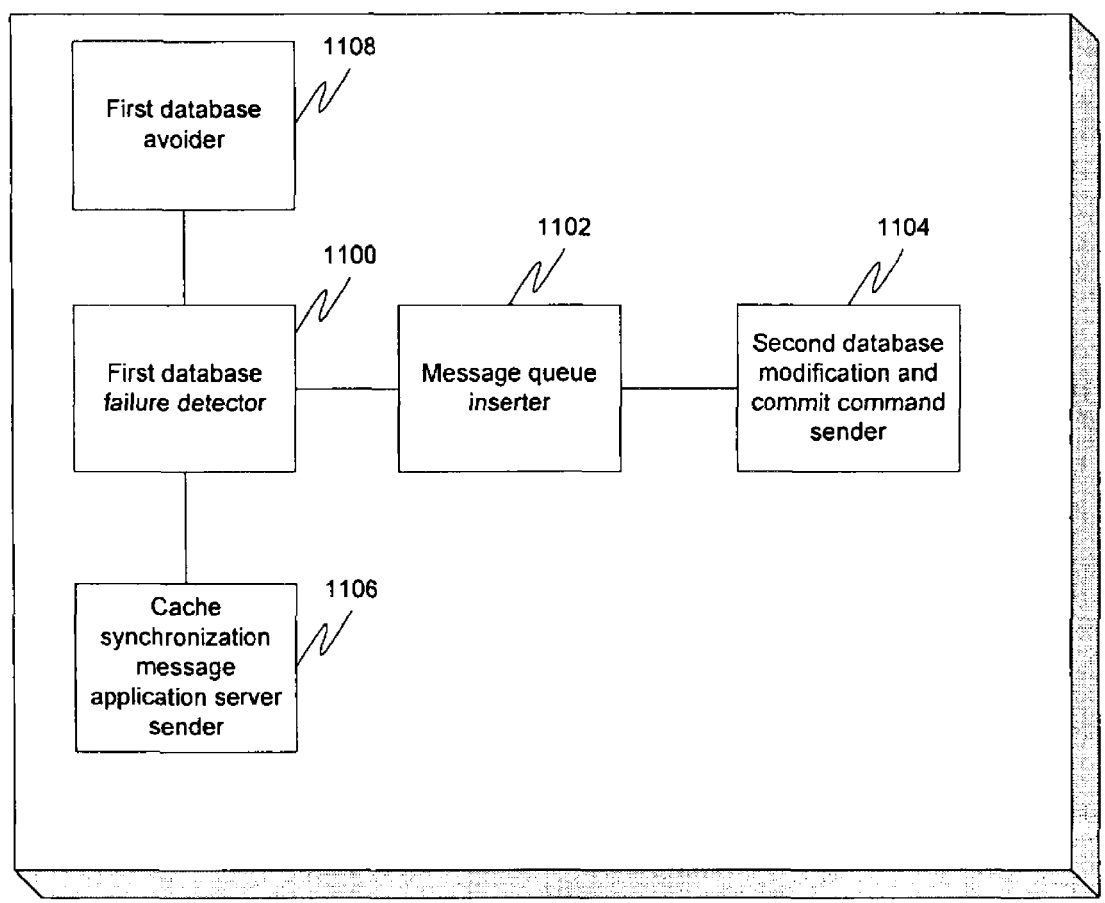
FIG. 11 is a block diagram illustrating an apparatus for failover from a failure of a first database in accordance with an embodiment of the present invention.

FIG. 11 is a block diagram illustrating an apparatus for failover from a failure of a first database in accordance with an embodiment of the present invention. A failure of the first database will typically manifest itself as an error from the database client library. If the error indicates a minor or transient failure, then an exception may be thrown back to the business logic code for handling. On the other hand, if it is a fatal error, indicating a database failure, then the application server may execute the following recovery procedure.

A failure of the first database will be detected during 400, 402, or 406 of the method described in FIG. 4. In all cases, the transaction in the first database will not be completed, and thus the application server may note the fact that the database is down and proceeds with the rest of the method (or at least those steps it can execute while the first database is down). For example, if the failure is detected in 400, the application server may proceed to 404, 408, and 410. If the failure is detected in 406, the application server may proceed to 408 and 410.

In 410, the cache synchronization message may be marked with a flag indicating that the first database is down. Upon receiving the specially marked cache synchronization message, the recovery server need not discard the corresponding message from its persistent message queue. Instead, the recovery server may wait for the first database to be restored, at which point it replays to the first database the inserts, updates, and deletes that are captured in the persistent message's payload. Then the recovery server may discard the message from the queue.

In future transactions, the application server knows that it must avoid the first database and may go directly to the second database until the first database is restored to service and brought up-to-date by the recovery server.

The failover here is very nearly instantaneous, once the application server discovers that the database server is down. However, this discovery may take some time in situations where a timeout of some sort must expire. For instance, the application server may need to wait for a TCP socket timeout before the database client libraries deliver the error code that signals failure. The length of such a timeout is somewhat beyond the control of the system, though it may be tuned by a system administrator.

Therefore, a first database failure detector 1100 may detect a failure of a first database. A message queue message inserter 1102 coupled to the first database failure detector 1100 may place a message in each of the message queues as described in 404 of FIG. 4 above, if no failure in the first database has been detected. A second database modification and commit command sender 1104 coupled to the message queue message inserter 1102 may then send the same set of database modification commands it sent to the first database to a second database, along with a commit command. This is described in 408 of FIG. 4 above. A cache synchronization message application server sender 1106 coupled to the first database failure detector 1100 may send a cache synchronization message to the other application servers of the cluster and to the recovery servers. While this is similar to what was described in 410 of FIG. 4 above, here the cache synchronization message is marked with a flag that indicates that the first database is down. A first database avoider 1108 coupled to the first database failure detector 1100 may avoid the first database in future transactions until the first database is restored to service and brought up-to-date by a recovery server.

Figure 12:
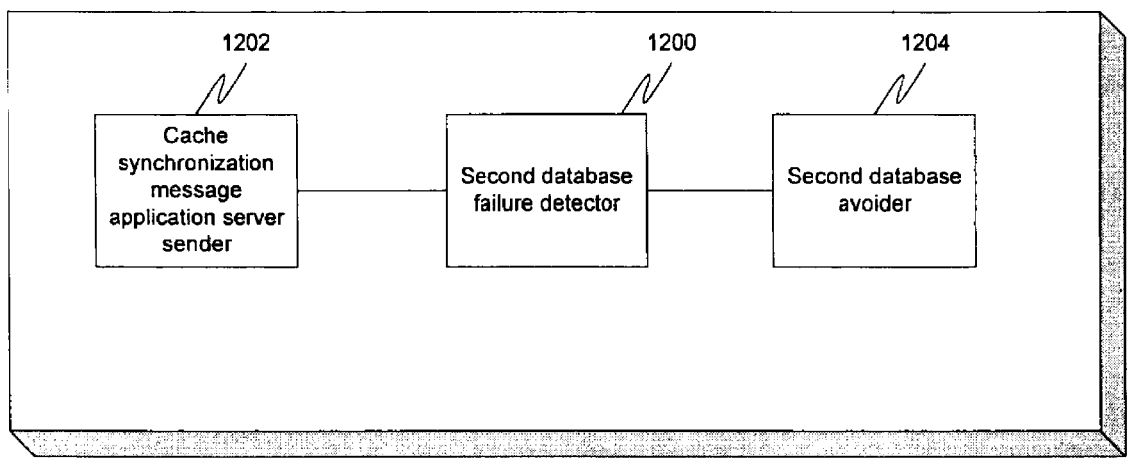
FIG. 12 is a block diagram illustrating an apparatus for failover from a failure of a second database in accordance with an embodiment of the present invention.

FIG. 12 is a block diagram illustrating an apparatus for failover from a failure of a second database in accordance with an embodiment of the present invention. A failure of the second database will typically manifest itself in 408 of FIG. 4. Here, the application server may then simply proceed with 410, while marking the cache synchronization method with a flag indicating that the second database is down. Upon receiving this specially marked cache synchronization message, the recovery server need not discard the corresponding message from its persistent message queue. Instead, the recovery server may wait for the second database to be restored, at which point it may replay the database inserts, updates, and deletes that are captured in the persistent message's payload. The recovery server may then discard the message from the queue.

The application server knows that it must avoid the second database until it is restored and brought up-to-date by the recovery server.

Therefore, a second database failure detector 1200 may detect a failure of a second database. A cache synchronization message application server sender 1202 coupled to the second database failure detector 1200 may send a cache synchronization message to the other application servers of the cluster and to the recovery servers. While this is similar to what was described in 410 of FIG. 4 above, here the cache synchronization message is marked with a flag that indicates that the second database is down. A second database avoider 1204 coupled to the second database failure detector 1200 may avoid the second database in future transactions until the second database is restored to service and brought up-to-date by a recovery server.

Figure 13:
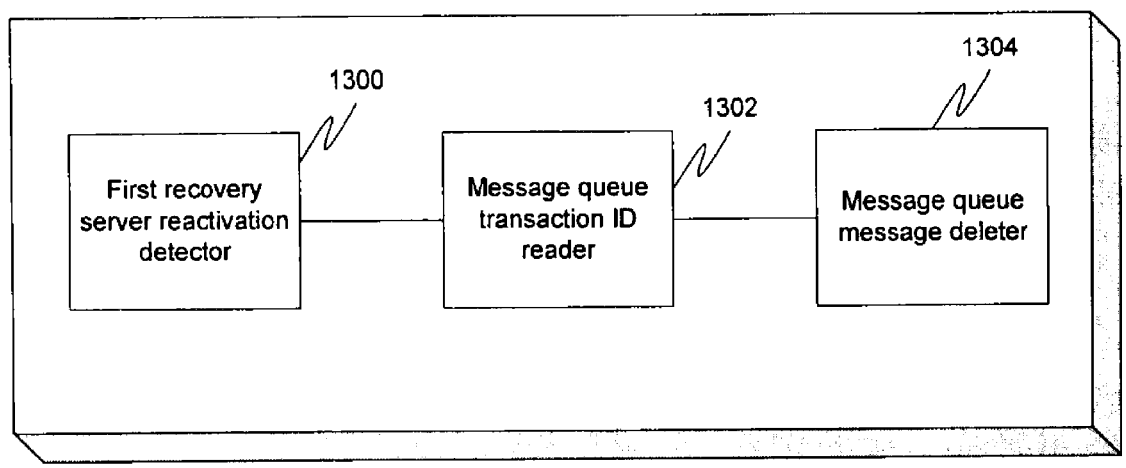
FIG. 13 is a block diagram illustrating an apparatus for restoring from a failure of a first recovery server in accordance with an embodiment of the present invention.

FIG. 13 is a block diagram illustrating an apparatus for restoring from a failure of a first recovery server in accordance with an embodiment of the present invention. The second recovery server will usually detect the failure of the first recovery server by an interruption in the heartbeat messages sent by the first recovery server. At that point, the second recovery server will assume the recovery server duties. Because it has been receiving both the cache synchronization and the persistent message queue traffic, it is ready to step in at any time. When the failure is corrected so that the first recovery server is brought back online, all of the messages in the persistent queue that it missed will be waiting for processing. However, the corresponding cache synchronization messages may have vanished. Therefore, the first recovery server may read the transaction ID out of the queued messages and check for the corresponding row in the special transaction ID table. If it exists, then there is no need for the queued message anymore, so it may be deleted. If not, the message maybe saved for later processing. Once the entire queue has been scanned in this way, the recovery server can begin sending heartbeat messages and the two recovery servers may revert to their normal roles.

Therefore, a first recovery server reactivation detector 1300 may detect the reactivation of a failed first recovery server. A message queue transaction ID reader 1302 coupled to the first recover server reactivation detector 1300 may read a transaction ID out of any queued messages in its corresponding message queue. A message queue message deleter 1304 coupled to the message queue transaction ID reader 1302 may check for the corresponding row in the special transaction ID table. If it exists, then the queued message may be deleted. Once all the queued messages have been processed, then the first recovery server may resume normal operations.

Because the persistent message queue delivers its messages whether or not the recovery servers are running at the time of the sending, the application servers (and therefore the clients) see no interruption of service. The second recovery server takes over immediately after the heartbeat messages stop, so if the heartbeat interval is sent to one or two seconds, the delay will be no more than ten seconds. Failure of the second recovery server may be handled in a similar way, except that no switch in the primary and standby roles is necessary.

Figure 14:
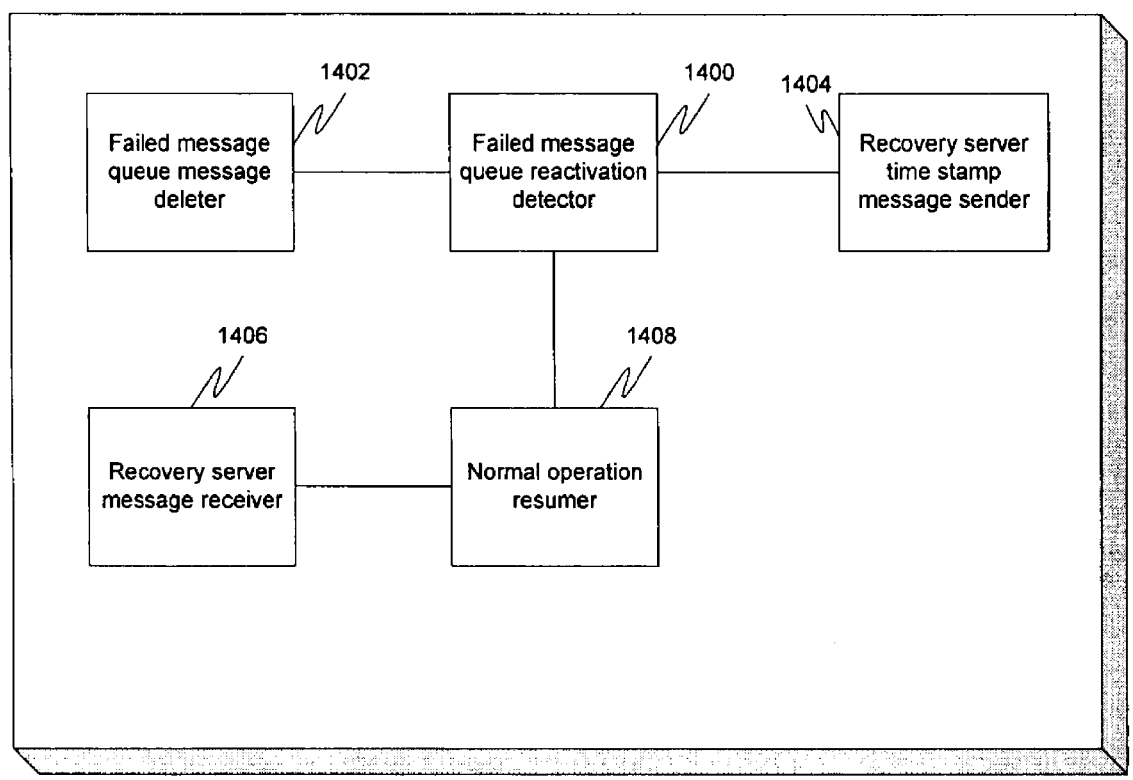
FIG. 14 is a block diagram illustrating an apparatus for restoring from a failure of a message queue in accordance with an embodiment of the present invention.

FIG. 14 is a block diagram illustrating an apparatus for restoring from a failure of a message queue in accordance with an embodiment of the present invention. A failure of either message queue will typically be detected by both the application servers (in 404 of FIG. 4 above) and by one of the recovery servers (as they attempt to receive messages). The application servers may ignore such failures, because their messages are getting through to the other queue. The affected recovery server, upon noticing that its queue is down, may send a signal to the other recovery server that it cannot continue. In that way, the failover is handled in a way similar to that of the failure of a recovery server, except that the failure may be communicated explicitly rather than by the absence of heartbeat messages.

Restoration of service may be a bit trickier. This is because when the failed queue is restored to service, it will not contain any of the messages sent while it was down. To rectify this, the associated recovery server will empty its queue and start processing all new messages. In addition, it may send a message to the other recovery server containing the time stamp of the first new message it receives. The other recovery server may respond when the oldest message still in its queue is not older than this time stamp. At that point, the recovery server associated with the formerly failed queue will know that it is up-to-date and ready to resume normal operation.

Therefore, a failed message queue reactivation detector 1400 may detect the reactivation of a failed message queue.

Then a failed message queue message deleter 1402 coupled to the failed message queue reactivation detector 1400 may delete any messages in the failed message queue. It may then begin processing all new messages. A recovery server time stamp message sender 1404 coupled to the failed message queue reactivation detector 1400 may send a message to another recovery server containing a time stamp of the first new message it processes. A recovery server message receiver 1406 may receive a message from the other recovery server indicating that the oldest message still in its queue is not older than the time stamp. A normal operation resumer 1408 coupled to the failed message queue reactivation detector 1400 and to the recovery sever message receiver 1406 may cause the recovery server associated with the failed queue to resume normal operation.

Figure 15:
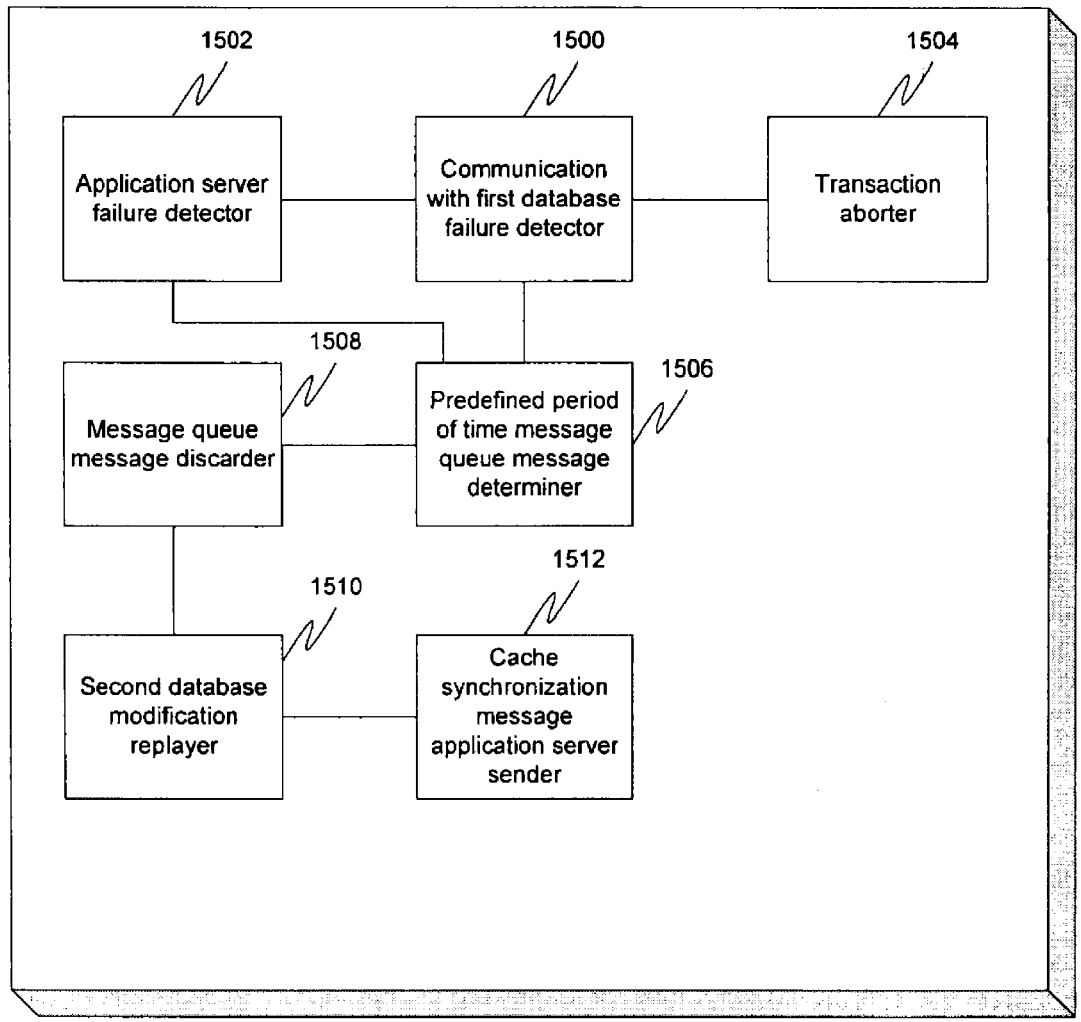
FIG. 15 is a block diagram illustrating an apparatus for failover from a failure of an application server in accordance with an embodiment of the present invention.

FIG. 15 is a block diagram illustrating an apparatus for failover from a failure of an application server in accordance with an embodiment of the present invention. For the failure of an application server, there are a number of scenarios to consider. If the failure occurs during 400, 402, or 404 of FIG. 4, then the first database may automatically abort the transaction. If the failure occurs during 406 of FIG. 4, then the database may automatically abort the transaction and the recovery server will eventually notice that the message has been in its persistent message queue for a period of time (e.g., 5 seconds). The recovery server may then check the transaction ID table in the first database to see if the transaction's ID is present. In this case, it will not find it, so it may conclude that the transaction never committed and it may discard the message.

If the failure occurs during 408 of FIG. 4, then the recovery server will notice that the message has been in its queue for a period of time (e.g., 5 seconds). The recovery server may then find the transaction ID in the first database but not the second database. The recovery server may then replay the database changes to ensure that the second database is consistent with the first database. Then the recovery server may send a cache synchronization message so that the other application servers can update their caches.

If the failure occurs during 410 of FIG. 4, then the recovery server will notice that the message has been in its queue for a period of time (e.g., 5 seconds), and it will determine that the first database and the second database have already been updated. Therefore, the recovery server may simply send a synchronization message so that the other application servers can update their caches.

Therefore, an application server failure detector 1500 may detect a failure of an application server. A communication with first database failure detector 1502 may be determined if the failure occurred during a communication with a first database or a message queue. This would include 400, 402, 404, or 406 of FIG. 4. If so, then a transaction aborter 1504 coupled to the communication with first database failure detector 1502 may automatically abort the transaction. A predefined period of time message queue message determiner 1506 coupled to the application server failure detector 1500 and to the communication with first database failure detector 1502 may determine if the message has been in the queue for a set period of time (e.g., 5 seconds). If so, then the recovery server may check the transaction ID table in the first database to see if the transaction's ID is present. If not, then a message queue message discarder 1508 coupled to the predefined period of time message queue message determiner 1506 may discard the message. If so, then it may determine if the transaction ID is present in the second database. If not, then a second database modification replayer 1510 coupled to the message queue message discarder 1508 may replay the database changes to ensure that the second database is consistent with the first database. Then a cache synchronization message application server sender 1512 coupled to the second database modification replayer 1510 may send a cache synchronization message so that the other application servers can update their caches.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for failover from a failure of a first database during processing of a transaction, the transaction requesting a set of database modifications, the method comprising:
   detecting the failure in the first database;
   placing a message in one or more message queues, the message indicating an object inserted, updated or deleted in the transaction;
   sending the set of database modifications and a commit command to a second database;
   processing a future transaction with the second database until the first database is restored;
   sending a cache synchronization message to a plurality of application servers sharing a same cluster as an application server executing the method, the cache synchronization message including an indication that the first database is down;
   receiving the cache synchronization message at another application server;
   extracting a transaction ID from the cache synchronization message; and
   discarding messages containing the transaction ID from one or more message queues.

2. A method for failover from a failure of a first database during processing of a transaction, the transaction requesting a set of database modifications, the method comprising:
   detecting the failure in the first database;
   placing a message in one or more message queues, the message indicating an object inserted, updated or deleted in the transaction;
   sending the set of database modifications and a commit command to a second database;
   processing a future transaction with the second database until the first database is restored; and
   sending a cache synchronization message to a plurality of application servers sharing a same cluster as an application server executing the method, the cache synchronization message including an indication that the first database is down;
   wherein sending the set of database modifications and the commit command to a the second database and sending the cache synchronization message are performed asynchronously on separate threads.

3. A method for failover from a failure of a second database during processing of a transaction, the transaction requesting a set of database modifications, the method comprising:
   detecting the failure in the second database;
   sending a cache synchronization message to a plurality of application servers sharing a same cluster as an application server executing the method, the cache synchronization message including an indication that the second database is down;
   processing a future transaction with a first database until the second database is restored;

receiving the cache synchronization message at another application server;

extracting a transaction ID from the cache synchronization message; and discarding messages containing the transaction ID from one or more message queues.

4. An apparatus for failover from a failure of a first database during processing of a transaction, the transaction requesting a set of database modifications, the apparatus comprising:

means for detecting the failure in the first database;

means for placing a message in one or more message queues, the message indicating an object inserted, updated or deleted in the transaction;

means for sending the set of database modifications and a commit command to a second database;

means for processing a future transaction with the second database until the first database is restored;

means for receiving the cache synchronization message at another application server;

means for extracting a transaction ID from the cache synchronization message; and means for discarding messages containing the transaction from one or more message queues, wherein the apparatus is located on an application server.

5. An apparatus for failover from a failure of a first database during processing of a transaction, the transaction requesting a set of database modifications, the apparatus comprising:

means for detecting the failure in the first database;

means for placing a message in one or more message queues, the message indicating an object inserted, updated or deleted in the transaction;

means for sending the set of database modifications and a commit command to a second database; and means for processing a future transaction with the second database until the first database is restored, wherein the apparatus is located on an application server, and wherein sending the set of database modifications and the commit command to a the second database and sending the cache synchronization message are performed asynchronously on separate threads.

* * * * *